F. MORTENSEN.
ARRANGEMENT FOR SEPARATORS WITH HANGING BOWLS.
APPLICATION FILED MAR. 21, 1919.
1,403,341.
Patented Jan. 10, 1922.
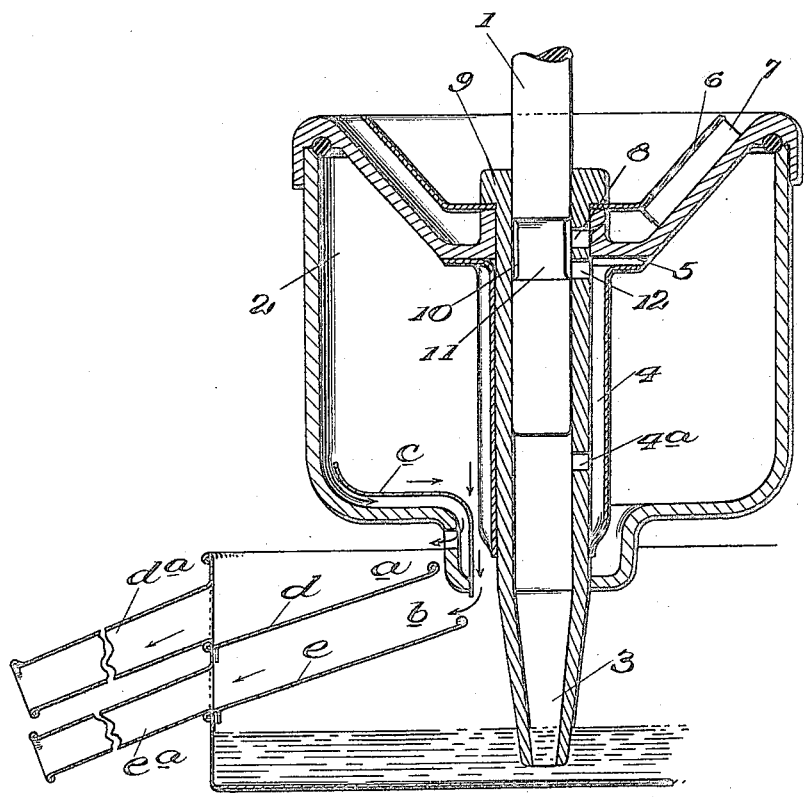
WITNESSES
W. A. Williams
Chas. R. Wright
INVENTOR
Frantz Mortensen.
BY
ATTORNEYS

UNITED STATES PATENT OFFICE.

FRANTZ MORTENSEN, OF HELSINGFORS, FINLAND.

ARRANGEMENT FOR SEPARATORS WITH HANGING BOWLS.

1,403,341.                Specification of Letters Patent.   Patented Jan. 10, 1922.

Application filed March 21, 1919. Serial No. 284,228.

*To all whom it may concern:*

Be it known that I, FRANTZ MORTENSEN, a subject of the King of Denmark, and a resident of Helsingfors, Finland, have invented a new and Improved Arrangement for Separators with Hanging Bowls, of which the following is a full, clear, and exact description.

In separators with suspended bowl it is usual to suck the new milk into the bowl by a suction device placed in connection with the latter, for instance, by wings fastened to the bowl and working as a suction fan. The milk is then conveniently sucked from a milk vessel placed under the bowl through a nozzle at the lower part of the bowl and then through a channel suitably arranged close to the spindle, wherefrom it is forced into the bowl at the upper end of the channel by centrifugal force.

In separators of this kind hitherto used the air channel leading from the mentioned milk channel to the suction device is usually placed so close to the inner level of the milk in the bowl, that the liquid not infrequently is caught by the air current and thrown out through the suction fan.

The present invention has the purpose of preventing this trouble and consists to that effect mainly of an arrangement in which apertures are leading from the milk channel mentioned above and from the suction device approximately toward the center line of the bowl to a space near the center line.

A way to carry out the invention is illustrated on the drawing which shows the arrangement partly in vertical section, applied to a separator of the kind mentioned above.

The spindle 1 carries on its lower end the bowl 2, to the lower part of which a nozzle 3 is fastened, submerged in a milk vessel A. The milk is sucked from the milk vessel through the nozzle 3 by an arrangement as described below, and enters through opening 4ª the channel 4 arranged close to the spindle, for instance in connection with a center tube, and flows then from an outlet at its upper end 5 into the bowl. The neck of the bowl is provided with openings *a* and *b* and in the lower part of the bowl is a division plate *c* extending into the neck and forming with the bowl passages for the skimmed milk and cream. The skimmed milk is discharged through the opening *a* into the pan *d* having a discharge about *d*ª and the cream through opening *b* into the pan *e* having the discharge spout *e*ª. The device creating the suction of the milk consists of the wings 7 fastened between the top of the bowl and a covering plate 6; during the rotation of the bowl the wings are working in the same way as a suction fan, the suction extending itself through a channel 8 in the bowl nave 9 to the space 10 between the nave 9 and a thinner part 11 of the spindle 1 and therefrom to another channel 12 which is in connection with the space 10 and the milk channel 4.

The intermediate space or air channel 10 is thus placed so close to the center of the separator bowl that the centrifugal force acting on the milk at the outlet 5 or the channel 4 is able to overcome the suction acting in the opposite direction through the channels 8, 10 and 12. In this way any part of the liquid is prevented from being sucked through the air channel and thrown out through the suction fan. In carrying out the invention as shown on the drawing the placing of the air channel near the center has been achieved by making the separator spindle 1 thinner at the part 11. Furthermore, by this, a practical and easily accessible arrangement of the suction channels as well as a perfect guide of the bowl on the spindle and a convenient suspension of the bowl are attained.

However, the same object can be achieved in other ways than shown on the drawing, without departing from the idea in the invention, for instance, by an extension of the bowl nave, while the thickness of the spindle remains unchanged, or by making an extension of the nave and the same time inclining the spindle.

As it appears from the drawing, only the suction arrangement is placed at the top of the bowl, while the inlet for the new milk is placed at the lower part of the bowl. Here the cream and the skim milk outlets are also conveniently placed, through which complete freedom with regard to position and dimensions of the suction space 10 and its apertures is attained, without taking the above named in and outlets into consideration.

Claims:

1. A separator of the type having a suction fan for drawing in milk, and having an aperture through which cream is driven due to the separating action of centrifugal force, and characterized by having an outlet at one side of the suction fan through which milk may be driven under centrifugal force to overcome the suction action which tends to draw the milk into the suction fan.

2. In a separator, a bowl, a suction device on the top of the bowl, a suction tube extending from the top of the bowl through the bottom thereof, a longitudinal tube communicating with the suction tube and having an outlet at its upper end discharging into the bowl, and means for establishing communication between the suction device and said tube, said means being substantially at the center of the bowl.

3. In a separator, a bowl, a suction device on the top of the bowl, a suction tube leading from the top of the bowl through the bottom thereof, and a spindle in the upper end of the tube, a longitudinal tube communicating with the suction tube at its lower end and having at its upper end an outlet discharging into the bowl, the spindle and suction tube being formed with a passage communicating at the upper end with the suction device and at its lower end with the said channel.

4. In a separator, a bowl, a suction device on the top of the bowl, a suction tube extending from the top of the bowl out through the bottom thereof, a spindle in the upper end of the tube and having a reduced portion forming with the tube a passage, and a longitudinal channel on the exterior of the tube and having at its upper end an outlet discharging into the bowl, the suction tube being provided with three ports, one opening in the lower end of the channel and the other two leading from the ends of the said passage, one establishing communication between the passage and the suction device and the other establishing communication between said passage and the channel.

FRANTZ MORTENSEN